May 11, 1937. H. J. BRANDENBURG 2,080,197
FRUIT BRUSHER
Filed July 10, 1934
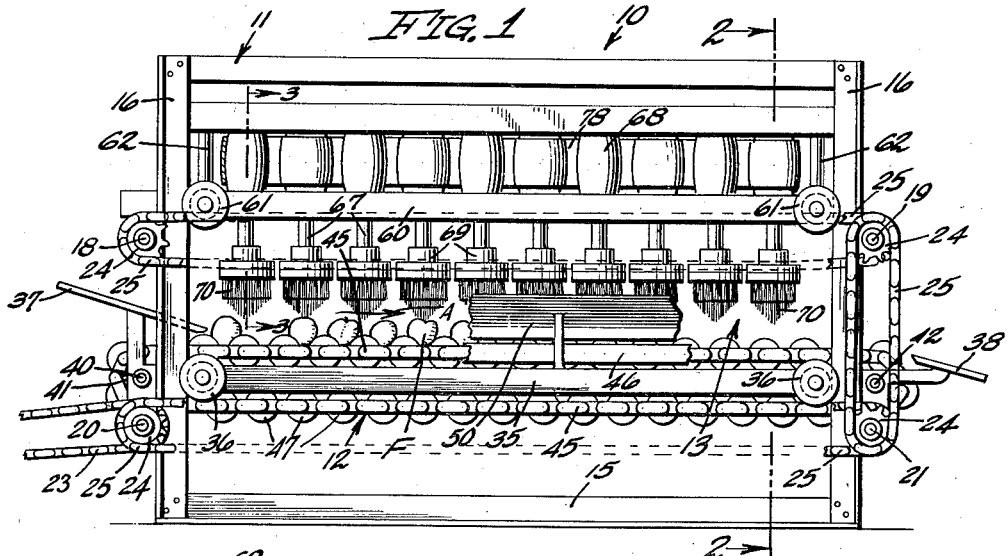
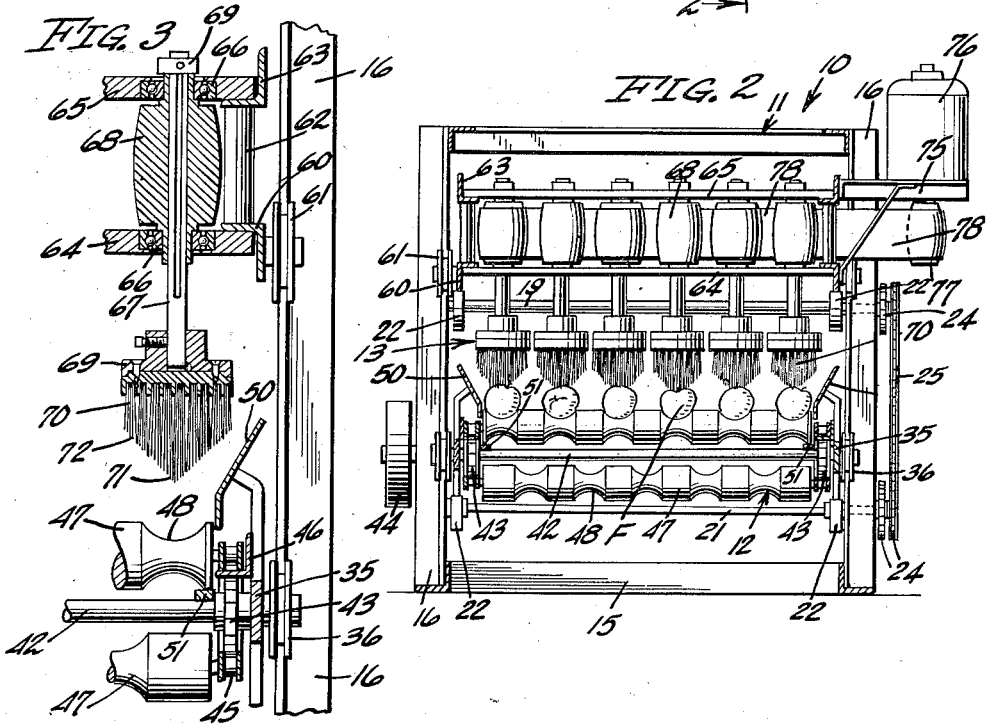
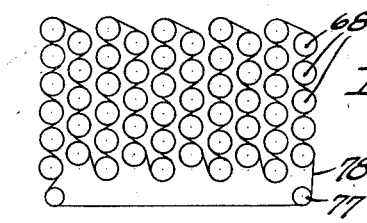
HARRY J. BRANDENBURG
INVENTOR.
BY 
ATTORNEY Patented May 11, 1937

2,080,197

UNITED STATES PATENT OFFICE 2,080,197

FRUIT BRUSHER

Harry J. Brandenburg, Glendora, Calif., assignor of fifty-five per cent to F. E. Wood, W. G. Cartter, J. B. Seem, and W. J. Bailey, all of Monrovia, Calif.

Application July 10, 1934, Serial No. 734,477

12 Claims. (Cl. 146—199)

My invention relates to the preparation of agricultural produce for market and more particularly to a fruit brushing machine for washing, drying, polishing, or otherwise treating fruit.

In preparing certain fruits, such as oranges, apples, and the like for commercial shipment these are usually washed, dried, and polished by mechanical apparatus, various forms of which have been devised for performing these functions. When handling very dirty and scaly fruit, however, the best of this apparatus fails to effectively reach the entire surface of fruit and particularly the sheltered areas thereon as in the stem and blossom ends of apples and oranges.

An object of my invention is to provide a fruit washing machine in which the space between the conveying surface and brushing surface may be quickly and easily changed.

Further objects and advantages will be made manifest in the following description in view of the accompanying drawing, in which:

Fig. 1 is a side elevational view of a preferred embodiment of my invention, certain portions thereof being broken away to more clearly show the structure.

Fig. 2 is a vertical sectional view taken on the line 2—2 of Fig. 1.

Fig. 3 is an enlarged, fragmentary, vertical sectional view taken on the line 3—3 of Fig. 1, and Fig. 4 is a diagrammatical plan view showing the means for transmitting power to the brushing elements of the machine shown in Fig. 1.

Referring specifically to the drawing, a fruit brushing machine 10, comprising a preferred embodiment of my invention, is shown in Fig. 1, this machine including a frame 11, a conveyor 12, and a brushing unit 13.

The frame 11 is constructed of angle iron to provide a rectangular base 15, from the four corners of which extend vertical angle iron posts 16. Journalled in suitable bearings on the posts 16 are upper shafts 18 and 19 and lower shafts 20 and 21 as shown in Fig. 1. Fixed on each of the shafts 18, 19, 20, and 21 are pairs of eccentrics 22. The shaft 20 is driven from any suitable source of power by a chain 23 trained about a suitable sprocket on the shaft 20. The shafts 18, 19, and 21 are driven by the shaft 20 by means of sprockets 24 and chains 25 as shown.

The conveyor 12 includes a pair of side plates 35 supported on the aforementioned eccentrics 22 of the shafts 20 and 21. Rotatably mounted on each of the plates 35 are pairs of grooved rollers 36 positioned to engage the innermost edges of the angle iron posts 16. Supported on one end of the plates 35 is an inlet board 37, an outlet board 38 being supported on the opposite ends of the plates 35 as shown in Fig. 1. Journalled in the plates 35 under the inlet board 37 is a transverse idle shaft 40 having sprockets 41 fixed thereon. Journalled in the opposite ends of the plates 35 is a driven shaft 42 having sprockets 43 and a pulley 44 keyed thereto. Trained about the sprockets 41 and 43 are endless chains 45, the upper flights of the latter being supported on suitable angle iron bars 46 provided on the plates 35 as shown in Fig. 3. Rotatably mounted between the chains 45 are rollers 47 formed to provide circumferential grooves 48, it being noted in Fig. 2 that grooves 48 of one roller are staggered in relation to the grooves 48 of the rollers adjacent thereto. Supported above the plates 35 are guard plates 50. Positioned under the ends of the rollers 47 of the upper flights of the chains 45 is a pair of rails 51 as seen in Figs. 2 and 3.

The brushing unit 13 includes a pair of angle iron bars 60 supported at each side of the frame 11 on the eccentrics 22 of the shafts 20 and 21 as shown in Fig. 2. Rotatably mounted on the bars 60 are grooved rollers 61 positioned to engage the inner edges of the posts 16 as shown. Supported above the bars 60 on suitable spacers 62 are similar angle iron bars 63. Supported on the angle iron bars 60 and 63 are lower and upper transverse bars 64 and 65, respectively, each pair of which is bored to receive pairs of ball bearings 66 in which the trunnions of pulleys 68 are journalled. Slidably splined within each of the pulleys 68 is a spindle 67 having a collar 69 fixed on the upper end thereof. Fixed on the lower end of each of the spindles 67 is a face plate 69 to the under side of which a brush 70 is mounted, the bristles of the latter being preferably shaped as shown to provide a point 71 and an angular brushing surface 72. Fixed to the angle irons 60 and 63 at one side of the brushing unit 13 is a bracket 75 upon which a vertical motor 76 is mounted. Fixed on the shaft of the motor 76 is a pulley 77, the latter being horizontally aligned with the pulleys 68 as shown in Fig. 2. Trained about the motor pulley 77 and all of the pulleys 68 is an endless belt 78 as diagrammatically shown in Fig. 4.

Operation

The conveyor 12 is driven in the direction indicated by the arrow A in Fig. 1 by a suitable motor (not shown) which is belted to the pulley 44 on the shaft 42. The rollers 47 resting on the rails 51 are continually rotated as the chains 45 pull the rollers as aforesaid.

It is to be understood that my fruit brusher may be used for washing, for drying, for polishing, or for otherwise treating fruit. If the brusher is used as a washer suitable nozzles (not shown) are provided for continuously directing jets of water onto the brushes 70. Fruit F to be washed is fed onto the inlet board 37 from a soaking tank (not shown) and gravitates onto the rollers 47 of the conveyor 12 and settles into the grooves 48 as shown, the fruit being rotated due to the aforementioned rotation of the rollers 47. While being thus rotated the fruit is carried through the machine 10 on the conveyor 12 and subjected to the scrubbing action of the rapidly rotating brushes 70. At the end of the conveyor 12 the fruit is finally discharged over the outlet board 38. Each piece of fruit F lodges in one of the grooves 48 of the rollers 47 and tends to remain in that particular groove until discharged from the machine. Due to the staggered relation of the brushes 70 each piece of fruit is alternately subjected to the points 71 and the angular portions 72 of the brushes 70. The rotation of the rollers 47 causes the fruit to be rotated in the grooves 48 so as to present the entire surface of each piece of fruit to the points 70 as well as the angular surfaces 72 of the brushes 70.

While the machine 10 is in operation the shafts 18, 19, 20, and 21 are continuously driven, the eccentrics 22 thereof causing the brushing unit 13 and the conveyor 12 to be raised and lowered, it being understood that the eccentrics 22 are timed so that the unit 13 is being lowered while the conveyor 12 is raised, thus decreasing and increasing the space between the brushes 70 and the conveyor 12. This action intermittently increases the pressure of the brushes 70 on the fruit F.

When my brusher is to be used as a drier, suitable air blowing apparatus may be employed to blow air through the fruit treating chamber to evaporate water from the fruit, from the conveyor 12, and from the bristles of the brushes 70. This air may go downward between the brushes, upward through the conveyor, or horizontally in any desired direction. When thus used my brusher dries fruit quickly and thoroughly because the greatest difficulty encountered in drying fruit is the problem of removing water from the depressions at the stem and blossom ends. As the fruit revolves and travels along beneath the brushes 70 with the latter whirling at high speed, the points of one or more of these brushes almost inevitably comes into each depression in each piece of fruit and completely wipes the drops of water from this depression. The whirling brushes divide up this water so finely that it is readily evaporated by the air current passing through the machine, thus dissipating the water so that the fruit comes from the machine with the outer surface thereof dry.

When my brusher is used as a polisher, the fruit may merely be run through it dry as it is after leaving a drier. If desired, wax may be applied in small quantities to the fruit just before or after it enters the polisher, in which case this wax is equally distributed over the entire surface of the fruit by the action of the brushes so that all exterior surfaces of the fruit have a high waxed gloss when the fruit leaves the polisher.

Although I have shown and described but one form of my invention, it is to be understood that various modifications and changes might be made therein without departing from the spirit of the invention or the scope of the appended claims.

I claim as my invention:

1. A combination as in claim 6 in which said brush is tapered to provide a pointed portion on the lower end thereof.

2. In a fruit treating machine, the combination of: a frame; a fruit conveyor mounted on said frame; a plurality of closely spaced, parallel rollers carried by said conveyor, said rollers extending transversely across the path of said conveyor, certain of said rollers being formed to provide a plurality of spaced circumferential grooves, the latter receiving and retaining pieces of fruit; and a fruit surface treating element provided over said conveyor and rotatable on an upright axis while contacting fruit carried by said conveyor.

3. In a fruit treating machine, the combination of: a frame; a conveyor mounted on said frame; a plurality of closely spaced rollers carried by said conveyor, said rollers extending transversely of the direction of travel of said conveyor, each of said rollers being formed to provide a plurality of circumferential grooves, each pair of said grooved rollers coacting to provide pockets therebetween for receiving and retaining pieces of fruit; a plurality of brushes over said conveyor, each of said brushes being rotatable about a vertical axis, the lower portions of said brushes contacting said fruit; and means for rotating said brushes continuously at a high rate of speed.

4. A combination as in claim 3 in which means is provided on said frame for changing the distance between said conveyor and the lower portions of said brushes at regularly recurring intervals.

5. In a fruit treating machine, the combination of: a frame; a conveyor mounted on said frame; a plurality of closely spaced rollers carried by said conveyor, said rollers extending transversely of the direction of travel of said conveyor, each of said rollers being formed to provide a plurality of circumferential grooves, each pair of said grooved rollers coacting to provide pockets therebetween for receiving and retaining pieces of fruit; and a plurality of transverse rows of brushes extending across the direction of travel of said conveyor, each of said brushes being rotated about a vertical axis, the brushes of each alternate row thereof being staggered in relation to the brushes of the other rows thereof, said brushes being positioned to engage said fruit on said conveyor.

6. In a fruit treating machine, the combination of: a frame; a horizontal conveyor mounted on said frame; means on said conveyor forming a plurality of definitely located fruit trapping depressions and a brush mounted over said conveyor, said brush being rotatable about a vertical axis and positioned to contact fruit disposed on said conveyor in said depressions, said depressions retaining said fruit against displacement in relation to said conveyor by said brush.

7. In a fruit treating machine, the combination of: a frame; a conveyor mounted on said frame and extending longitudinally therethrough; means on said conveyor forming a plurality of longitudinal rows of fruit receiving depressions; a row of brushing elements disposed transversely over said conveyor, each of said brushes being rotatable about a vertical axis and positioned in vertical alignment with one of said rows of depressions, each of said depressions retaining a piece of fruit against displacement from said conveyor by said brushes; and means allowing relative vertical movement between said brushes and said conveyor.

8. In a fruit treating machine, the combination of: a frame; a horizontal conveyor mounted on said frame; means on said conveyor forming a plurality of fruit receiving depressions; means for positively rotating each piece of fruit in said depressions; and a fruit surface treating element on said frame over said conveyor, said element being rotatable about a vertical axis and positioned to contact fruit disposed in said depressions, said depressions retaining said fruit against displacement in relation to said conveyor by said treating element.

9. A combination, as in claim 6, in which said brush is rotated continuously about a vertical axis at a relatively high rate and in which is provided means for causing relative vertical movement between said brush and said conveyor at regularly recurring intervals.

10. In a fruit washing machine the combination of: a frame; a fruit conveyor mounted on said frame; means for driving said conveyor; a plurality of rows of relatively small closely spaced brushing elements rotated individually about upright axes and disposed across the path of and over said conveyor and extending downwardly to engage and brush fruit carried on said conveyor, the brushes of one such row being staggered relative to the brushes of the adjacent rows; and means provided on said conveyor and travelling therewith for trapping pieces of fruit on said conveyor so that said pieces of fruit are carried along definitely located longitudinal paths with said conveyor and are rotated by said conveyor as the latter operates.

11. In a fruit treating machine, the combination of: a horizontal conveyor including flexible endless chains and a series of rollers rotatably supported at their ends between said chains; means for causing said rollers to rotate as they travel between the upper flights of said chains; means for feeding fruit to said rollers; means for segregating and maintaining the fruit so fed in rows extending transversely of said rollers and parallel with the direction of their travel; rotary overhead brush means for scrubbing the fruit in each of said rows as it is conveyed in said direction by said rollers; and means for periodically reciprocating said brush means vertically with relation to said fruit during the operation of said machine.

12. In a fruit treating machine, the combination of: a frame; a horizontal conveyor including flexible endless chains and a series of rollers rotatably supported at their ends between said chains; means for causing said rollers to rotate as they travel between the upper flights of said chains; means for feeding fruit to said rollers; means for segregating the fruit on said conveyor into longitudinally parallel rows; fruit surface treating elements on said frame over said conveyor, said elements being rotatable about vertical axes intersecting said rows; means for rapidly and continuously rotating said elements; and means permitting vertical adjustment of said elements individually to pieces of fruit engaged by said elements.

HARRY J. BRANDENBURG.